United States Patent [19]

May

[11] Patent Number: 5,978,047
[45] Date of Patent: Nov. 2, 1999

[54] BLEMISH CONCEALMENT IN VIDEO SIGNALS

[75] Inventor: Robert Edward May, London, United Kingdom

[73] Assignee: The British Broadcasting Corporation, London, United Kingdom

[21] Appl. No.: 08/700,307

[22] Filed: Aug. 21, 1996

[30] Foreign Application Priority Data

Aug. 29, 1995 [GB] United Kingdom .................... 9517597
Jul. 31, 1996 [GB] United Kingdom .................... 9616212

[51] Int. Cl.⁶ .................................................... H04N 5/213
[52] U.S. Cl. .............................................................. 348/616
[58] Field of Search ..................................... 348/607, 615, 348/616, 617, 245, 246, 247, 251, 398, 700; 382/452, 275; 358/167, 163, 36; H04N 5/213

[56] References Cited

U.S. PATENT DOCUMENTS 4,590,520  5/1986  Frame et al. ............................. 348/616

FOREIGN PATENT DOCUMENTS

| 4-30676 | 2/1992 | Japan .............................. H04N 5/213 |
| 1 409 153 | 10/1975 | United Kingdom . |
| 1 547 811 | 6/1979 | United Kingdom . |
| 2 124 449-A | 2/1984 | United Kingdom . |
| 2 139 039 | 10/1984 | United Kingdom . |
| 2 139 039-A | 10/1984 | United Kingdom . |
| 2 202 706 | 9/1988 | United Kingdom . |
| 2 202 706-A | 9/1988 | United Kingdom . |
| 2 284 960 | 6/1995 | United Kingdom . |

OTHER PUBLICATIONS

R. Storey, "Electronic detection and concealment of film dirt," BBC Research Dept., Report BBC RD 1985/4, pp. 1–21 (London, England, Feb. 1985).

Childs, "BBC Research Department Report", RD 1985/3, pp. 15–24 (Feb. 1985) (GB XP002062676).

Mead, et al. "Scratch and Dirt Concealment Within a CCD–Based Telecine", pp. 246–250, International Broadcasting Convention, Brighton (GB) (Sep. 21, 1984) (XP002062677).

Derwent abstract of GB–2 139 039, Storey/BBC, granted Sep. 3, 1986.

Derwent abstract of GB–2 206,706, Borer/BBC, granted Jan. 9, 1991.

Primary Examiner—David E. Harvey
Attorney, Agent, or Firm—George W. Neuner

[57] ABSTRACT

A video signal 21 is input to a motion-compensated median filter to produce a preliminary blemish-concealed signal 23. The preliminary signal and the original input signal are passed via appropriate delays to respective inputs of a selector switch 31 and to a side chain circuit. The selector switch is controlled by the side chain circuit output and the selector switch output 22 forms a final blemish-concealed video signal. In the side chain circuit a difference signal C is generated to indicate differences between the input signal and the preliminary signal. The difference signal C is processed in two parallel circuit branches to remove differences having gently-sloping edges and differences corresponding to similar-sized differences in similar areas of adjacent frames, which are likely to be motion artifacts. The modified difference signals from each circuit branch are combined in an AND gate 95 to generate a control signal, which controls the selector switch 22 to output the original input signal except in image areas where the side chain processing indicates that a blemish is present.

25 Claims, 11 Drawing Sheets

BLEMISH CONCEALMENT IN VIDEO SIGNALS

FIELD OF THE INVENTION

This invention relates to the concealment of blemishes in a video signal. Blemishes may be caused by, for example, dirt or dust on a film from which the video signal is generated, or defects in the film emulsion, or characteristics of the film emulsion such as grain. The invention may be applicable generally to the removal of certain types of noise and grain effects in the signal.

BACKGROUND

It is well known that cinematographic film suffers degradation from the presence of dust and dirt on its surface. This can occur when the film is transferred into a video signal in a telecine, for broadcast transmission or recording on videotape. The dust or dirt then leads to black or dark marks in the image. Alternatively, degradation can occur during film copying, particularly from negative to positive, in which case white or light marks result. Film stock can also suffer similar types of defect for other reasons; for example aging of the film emulsion can lead to 'sparkle' in monochrome (black-and-white) film, as the silver falls off the film substrate.

It is desirable to be able to conceal these defects so as to improve the subjective image quality of the pictures for the viewer. One prior method is described in BBC Research Department Report RD 1985/4 "Electronic Detection and Concealment of Film Dirt", R. Storey, published by The British Broadcasting Corporation, Research Department, Kingswood Warren, Tadworth, Surrey, KT20 6NP, United Kingdom, and in United Kingdom Patent Application GB-A-2 139 039 BORER, the disclosure of which is incorporated by reference. In that method dirt is detected by comparison of the video signal derived from corresponding areas in three successive frames of a cinematographic film to determine whether the signal from the middle one of the three frames has a value which is substantially different from the values for the preceding and succeeding frames. If so, it is assumed that dirt is present on that area of the middle frame. The threshold amount by which the value of the signal in the middle frame differs from that to either side can be adaptively adjusted dependent upon signal content. Motion detection is used to detect the presence of movement in the scene content and to increase the threshold in the presence of movement.

This system is quite effective but does still have is certain limitations. In particular:

(I) it fails to conceal dirt in areas of high motion content, and (ii) it can introduce motion artifacts.

Another blemish concealment method is described in United Kingdom Patent Application GB-A-2 202 706. In this proposal a median selector is used. This is a circuit which has three inputs and selects as its output that one of the inputs which has the middle (median) value of the three input values. The median selector receives signals from three successive frames. By selecting the median value, extreme values caused by blemishes such as dirt are eliminated. Motion compensation is used. The signals from the 'preceding' and 'succeeding' frames are spatially displaced in dependence upon the output of a motion measurement circuit, so as to attempt to eliminate the effect of movement where this occurs.

This method introduces approximately 3 dB of noise reduction in the output signal. This is sometimes undesirable.

SUMMARY OF THE INVENTION

The method of the present invention operates without the need to provide a signal representing the presence of a blemish, but rather conceals the blemish without a separate blemish detection operation. This can be an advantage because it avoids the need to generate such a signal as a control signal, an operation which itself will never be perfect.

According to the present invention in a first aspect there is provided a method and apparatus for concealing blemishes in a video signal, in which a preliminary blemish-concealed video signal is generated from an input video signal, a difference-indicating signal or flag signal is generated indicative of differences between the preliminary blemish-concealed video signal and the input video signal, and an output blemish-concealed video signal is formed by selecting between or combining the preliminary blemish-concealed video signal and the input video signal in dependence upon the difference-indicating signal or flag signal.

According to the present invention in a second aspect, there is provided a method and apparatus for distinguishing blemishes in a video signal, in which a difference signal is generated representative of blemishes and other differences between images not caused by blemishes, and the blemishes and other differences are distinguished by reference to the steepness of the slope of the difference signal at the edges of each blemish or other difference.

According to the present invention in a third aspect, there is provided a method and apparatus for modifying a difference-indicating signal or flag signal comprising flags representative of blemishes in a video signal in order to remove flags associated with movement in the image rather than with blemishes, in which the flags on a current frame are compared with flags on one or both adjacent frames and, if a flag exists on an adjacent frame at a location within a predetermined distance of the flag on the current frame, the flag on the current frame is disabled.

The invention also provides video signals representing blemish-concealed images formed by the apparatus or method of any of these aspects of the invention for transmission or recording.

BRIEF FIGURE DESCRIPTION

The invention will be described by way of example with reference to the drawings, in which.

DETAILED DESCRIPTION

In this specific description references to dirt or other forms of blemish should be regarded as references to any appropriate form of blemish as described above.

Figure 1:
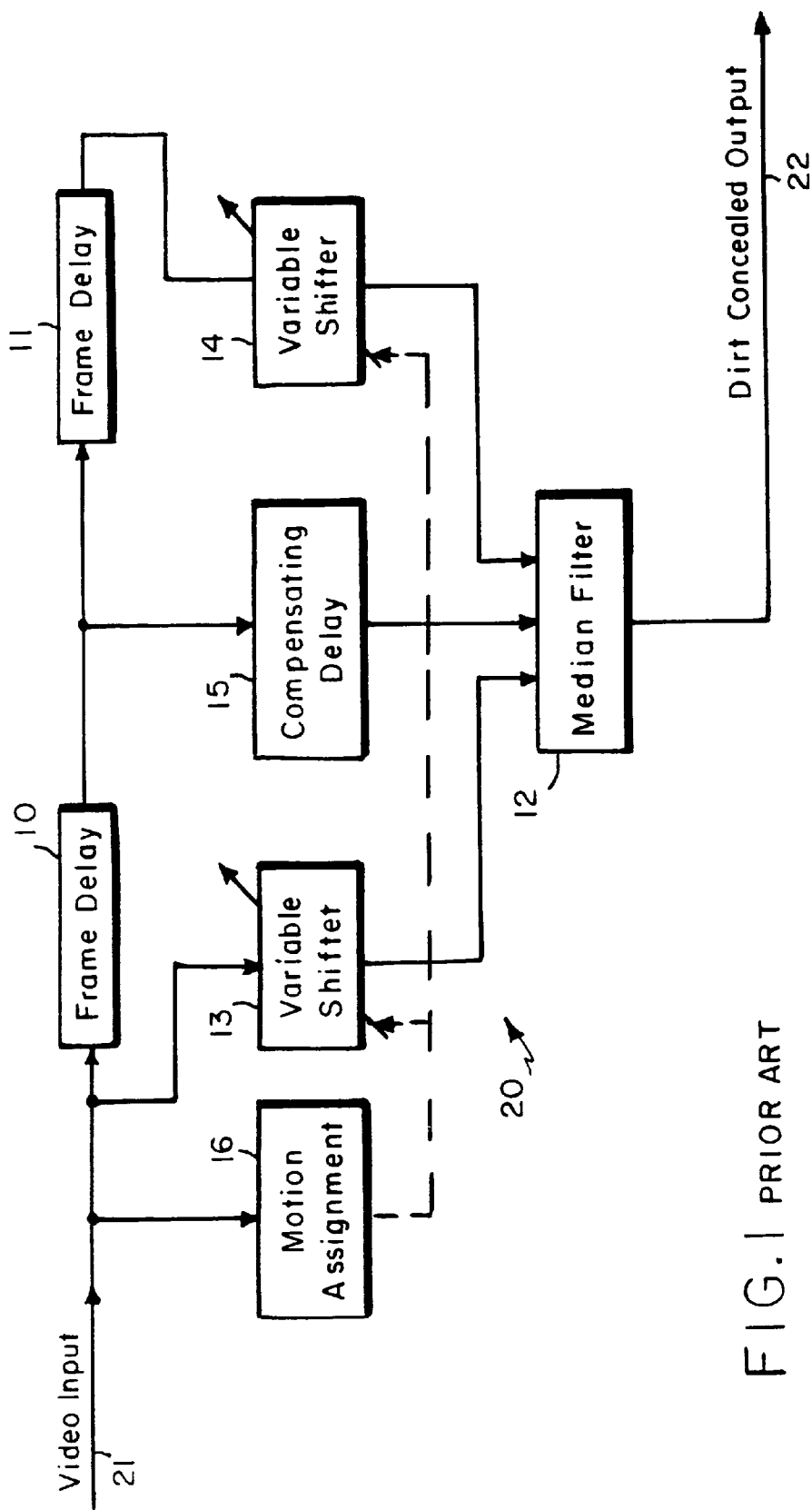
FIG. 1 is a block schematic diagram of a known film dirt concealer of the type described in GB-A-2 202 706.

Referring first to FIG. 1, the known video signal processing equipment of GB-A-2 202 706, BORER/BBC, will first be described. For further details reference should be made to that application. Briefly, the known system 20 comprises two frame (or picture) delays 10,11 connected in series to an input 21 to receive a video input signal so as to make three successive frames available simultaneously, and a median selector 12, also known as a median filter. To achieve motion compensation, the undelayed input signal and the two-frame-delayed signal are passed through respective variable two-dimensional shifters 13,14 comprising variable delays. The video signal delayed by one frame passes through a fixed compensating delay 15. These three signals, in relation to any subject frame (the one-frame-delayed signal), include the preceding and succeeding frames modified by being corrected for any movement that has taken place. The motion vectors required to control the shifters or interpolators 13,14 are derived by a motion measurement or vector assignment circuit 16.

The median selector or filter 12 selects the middle-valued one of the three inputs applied to it as the dirt-concealed output signal which it provides to an output 22. This output signal for a given frame may thus include portions of the preceding and succeeding frames modified by being motion-compensated.

In practice it is found that the motion vectors generated by the circuit 16 (or otherwise provided) are not perfect. Indeed they may be totally non-existent. Thus, although dirt or other blemishes will hopefully be concealed in the output, 'motion artifacts' can be introduced. Motion artifacts are simply impairments caused by motion-dependent processing. In addition, the use of the median filter leads to a 3 dB noise reduction or smoothing of image detail which is not required or desired.

Figure 2:
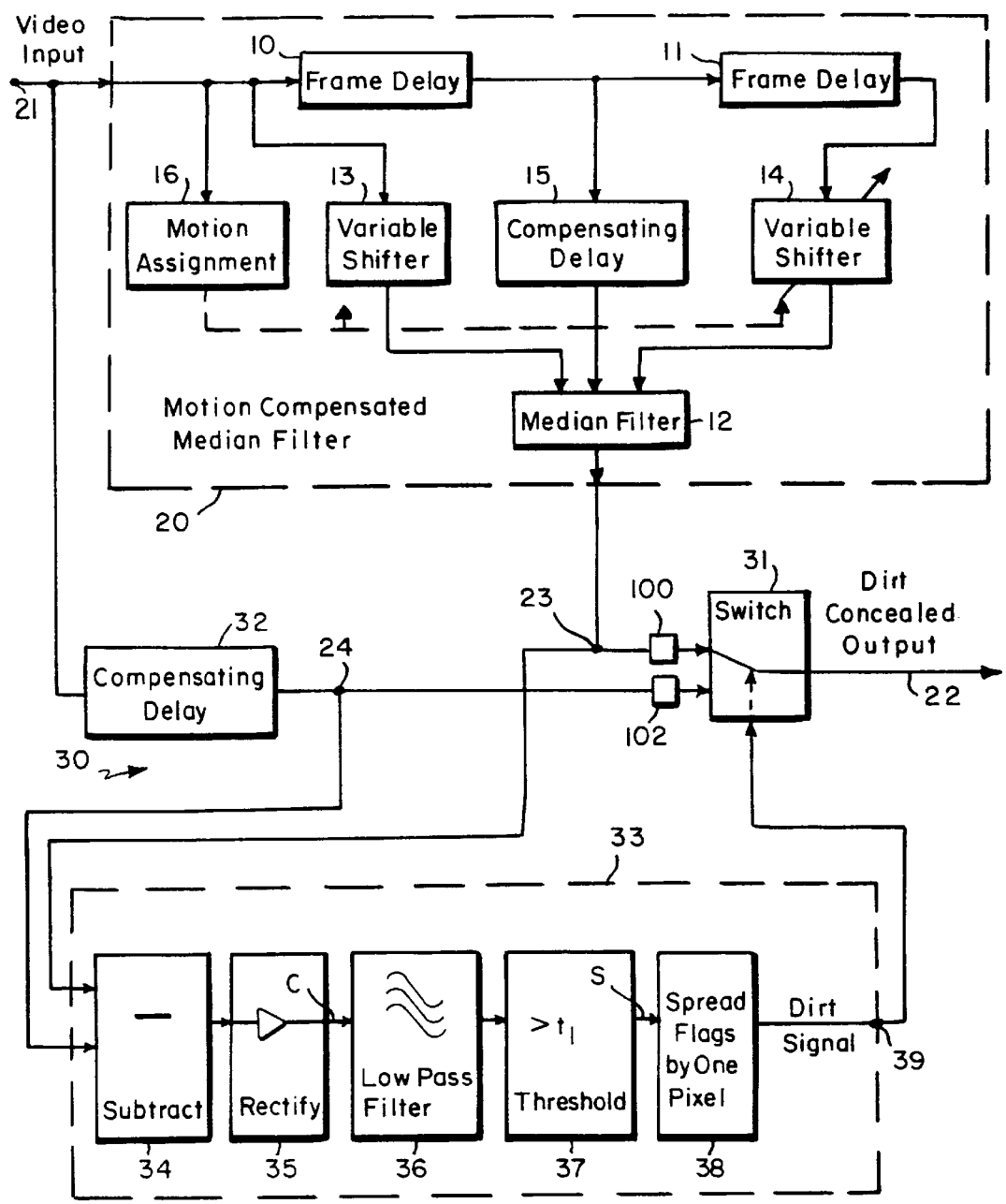
FIG. 2 is a block schematic diagram of a film dirt concealer embodying the present invention in certain aspects.

A first system 30 embodying the invention is shown in FIG. 2. Here again the video input signal received at an input 21 is applied to a motion-compensated median filter blemish-concealment arrangement 20 of the type described with reference to FIG. 1, in which concealment is achieved directly without the need for a separate dirt detection step. In certain circumstances other blemish concealment circuits, for example, of the type shown in GB-A-2 139 039, could alternatively be used. The output 23 of the concealment circuit 20 is in this instance not connected directly to the output 22. A selector switch 31 having two inputs and an output is connected with one input coupled via a compensating delay 100 to the output 23 of the concealment circuit 20 and its output coupled to the circuit output 22. The second input of the selector switch 31 is coupled to the input 21 to receive the video input signal through a compensating delays 32 and 102. The switch 31 has a control input, in response to which it selects as the dirt-concealed output either the output of the circuit 20 or the delayed input signal.

The control for the switch 31 is achieved by a side-chain 33. The side-chain receives the outputs 23,24 of the concealment circuit 20 and of the compensating delay 32. These two signals are applied to a subtracter 34, the output of which is rectified in a rectifier 35. By taking the difference between the video input and the median filter output and rectifying the result in this way, a signal is obtained which represents the magnitude of the changes introduced by the median filter. This 'changes' signal C is noisy due to the noise reduction effect of the median filter, and so is smoothed by a spatial low-pass filter 36. The filtered signal is applied to a threshold circuit 37 where it is compared with a threshold value $t_1$. This provides a flag signal S which represents significant changes between the original input signal and the blemish-concealed output of the median filter.

In the flag signal S, individual pixels are flagged to indicate significant changes but because the significant changes are caused by blemishes on the original frame or by motion-derived (or other) artifacts, groups of adjacent pixels will tend to be flagged indicating, for example, areas of dirt. For convenience such areas, or groups of flagged pixels, will be described herein as "flags" or "dirt flags".

In the case of perfect motion vectors, the flags in this 'significant changes' flag signal S mark the position of dirt in the original frame, because then the motion-compensation of the preceding and succeeding frames has perfectly aligned them with the subject frame. The flags are applied to a circuit 38 where they are each spread, or enlarged outwardly, by one pixel (or more) so as to ensure that the dirty areas are fully covered. Flag spreading or expansion is itself known from, for example, United Kingdom Patent Specifications GB-A-1 547 812 and 2 124 449, the disclosure of which are incorporated by reference. (see FIG. 9). The resultant signal from the circuit 38, which forms the output 39 of the side-chain 33, is then applied as the control signal to the control input of the switch 31.

Derived from the difference between the original input signal and the simple dirt-concealer output (in FIG. 2 the median-filter output) the flag signal thus indicates in which areas of the image groups of pixels have been changed by the simple dirt concealer. In those areas of the image, the flag signal controls the switch 31 to select the simple dirt-concealer output 23 for the circuit output 22. In this way, it is possible to maintain a high degree of dirt concealment in these areas. In other areas of the image, in which the flag signal indicates that the image has not been changed by the simple dirt-concealer, the flag signal controls the switch 31 to select the original image signal 24 for the circuit output 22.

In this way the side-chain 33 helps to correct some of the unwanted artifacts, such as motion artifacts, introduced by the simple dirt-concealer. Due to small differences between the subject frame and the preceding and succeeding frames, or inaccuracies in the motion-compensation between the frames, the simple dirt concealer using the median filter is likely to incorrectly replace individual pixels or small areas of the subject frame with corresponding pixels from one of the adjacent frames where no dirt is present. Such changes will be indicated in the 'changes' signal C in the side chain but will be eliminated by the low-pass filter or the threshold circuit and so will not be present in the 'significant changes' signal S or the flag signal. The flag signal will thus control the switch 31 to replace these incorrectly replaced pixels with the delayed original image signal. This switching back to the original image in areas in which the flag signal indicates no significant changes significantly reduces the occurrence of unwanted artifacts, such as motion artifacts, in unflagged areas. The 3 dB of noise reduction introduced in the median filter is also largely avoided, by using the median-filtered (noise-reduced) signal only when it is necessary.

It will be seen that the dirt concealment circuit of FIG. 2 is used both directly to conceal the dirt or other blemishes, and also indirectly to provide a dirt detector which itself selects whether the dirt concealment is to be employed or not.

While a switch 31 is shown, more generally other appropriate forms of selection circuit may be used. Indeed, a combining circuit can be employed in which variable combinations of the two inputs are taken. For example, around the edges of the dirt flags the delayed original image signal and the median-filtered signal may advantageously be multiplied respectively by factors z and (1−z) (where 0<z<1) and added together to form the dirt-concealed output 22. The factor z could be varied with distance from the dirt flag so as to blend the flag area, in which the median-filtered signal forms the dirt-concealed output, with the surrounding area, in which the original image signal forms the dirt-concealed output. This would provide more gentle transitions around the edge of the flag and reduce edge effects. The flag spreader 38 might then spread flags over a larger area than a one-pixel spread, or may spread flags over a non-integral number of pixels.

Since the motion vector signals generated by the motion assignment circuit 16 in FIG. 2 will never be perfect, the 'significant changes' signal S will still contain some components due to motion in the input signal. We have appreciated that additional processing can be included to improve the reliability of the flag signal.

Figure 3:
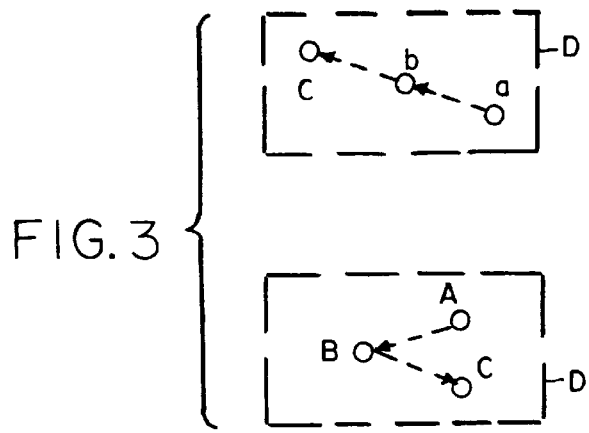
FIG. 3 illustrates the movement of flags caused by motion in adjacent frames.

It is assumed that dirt does not occur in the same place on adjacent frames. This assumption holds good for the majority of physical blemishes. Reference is now made to FIG. 3. This shows two examples of a moving object as displayed in the image. The positions b and B show in each case a moving object in a frame under consideration (the subject frame), the positions a and A show the respective object in the preceding frame and the positions c and C show it in the succeeding frame. It will be flagged in the flag signal at each of these positions. We propose that, in relation to positions b and B, a check should be made to determine whether any flags are present in the adjacent frames in a small area around the flag in the current frame. If a flag is found in such an area in an adjacent frame, then an assumption can be made that it is likely that the flags in the subject frame and the adjacent frame are caused by motion and not by a blemish. The flag(s) can therefore be unset or disregarded. Thus in FIG. 3, looking in an area D around b and B will find similar flags in the adjacent frames. This can be used, particularly if the flags are of similar size and shape, to indicate that the flags are probably caused by a moving object, rather than by a blemish.

Figure 4:
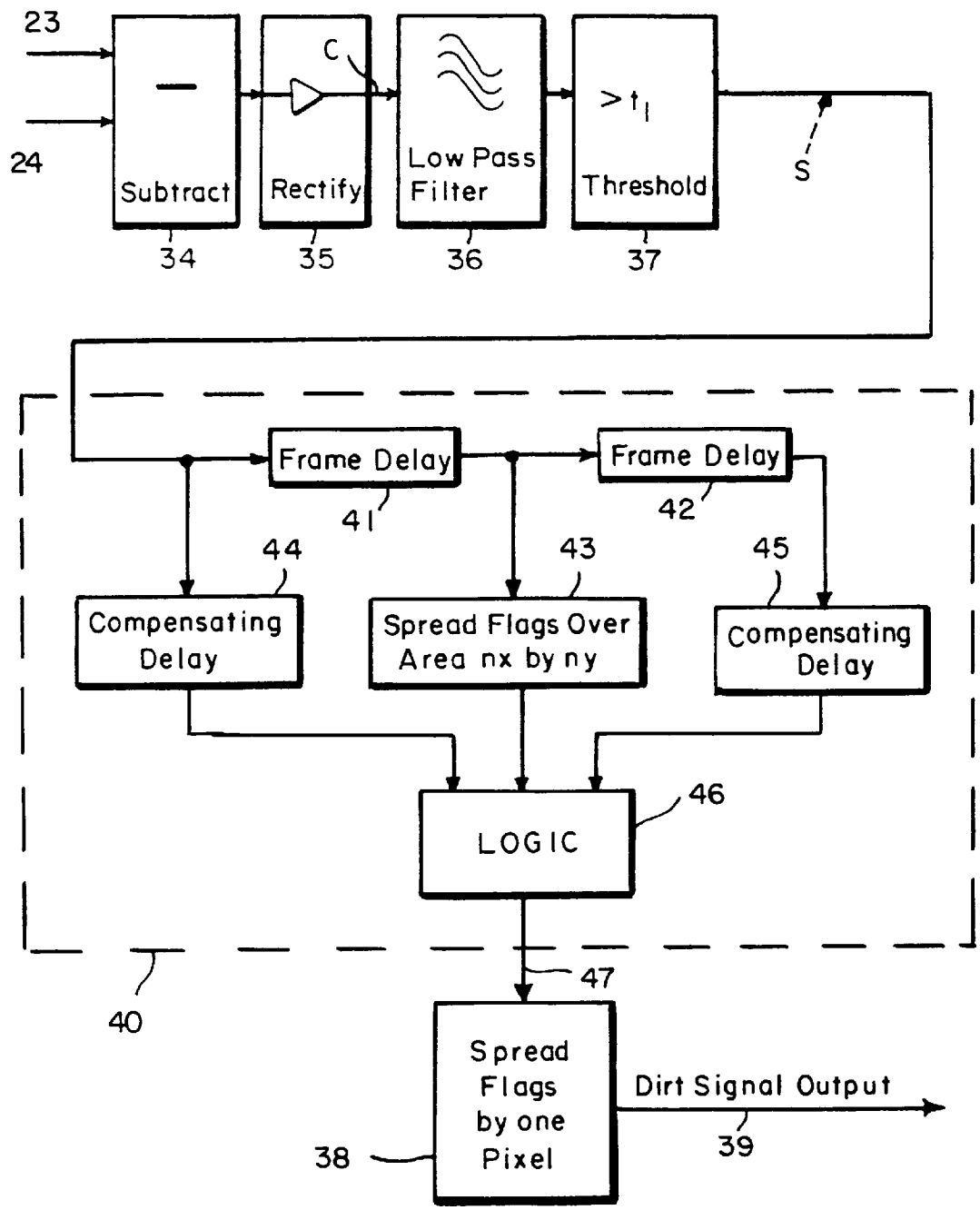
FIG. 4 illustrates the use of an adjacent flag protection circuit in the system of FIG. 2.

The circuitry necessary to achieve this is illustrated in FIG. 4.

Figure 12:
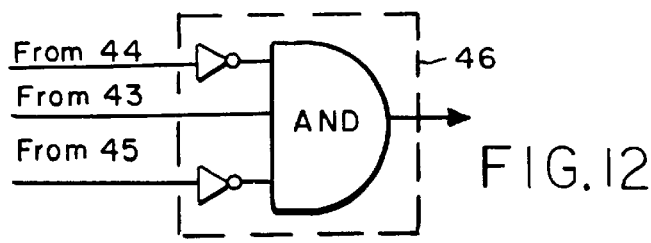
FIG. 12 is a circuit diagram showing the structure of logic block 46 in FIG. 4.

As shown in FIG. 4, a circuit 40 is included between the threshold circuit 37 and the flag-spreading circuit 38 in the side-chain 33 of FIG. 2. The circuit 40 comprises two frame delays 41,42 connected in series to the output of the low-pass filter 37. As in the simple dirt-concealer circuit, this provides signals from three successive frames. The output of the first delay 41 is applied to a second flag-spreading circuit 43 which spreads each flag over an area of n by n pixels (or n×m pixels). The preceding and succeeding fields are subject to compensating delays 44,45, and a logic circuit 46 receives the three signals from circuits 43, 44 and 45 as control signals. The logic circuit 46 is made of conventional gates, for example as shown in FIG. 12, in order to provide an output 47 as follows:

(I) If the output of circuit 43 does not indicate the presence of a flag, then the output of logic circuit 46 is logic low (i.e. no flag).

(ii) If the output of circuit 43 indicates the presence of a flag, and neither of the outputs of delays 44 and 45 indicate the presence of a flag, then the output of logic circuit 43 is logic high (i.e. flag present).

(iii) If the output of circuit 43 indicates the presence of a flag, and the output of either is or both of the delays 44 and 45 also indicates the presence of a flag, then the output of logic circuit 43 is logic low (i.e. no flag).

In instance (iii) it is assumed that, due to the presence of flags in an adjacent position of the image in at least one adjacent frame, the flag in the subject frame does not in fact represent a blemish, but rather is an unwanted consequence of movement in the picture. The flag in the subject frame is therefore cancelled.

Figure 5:
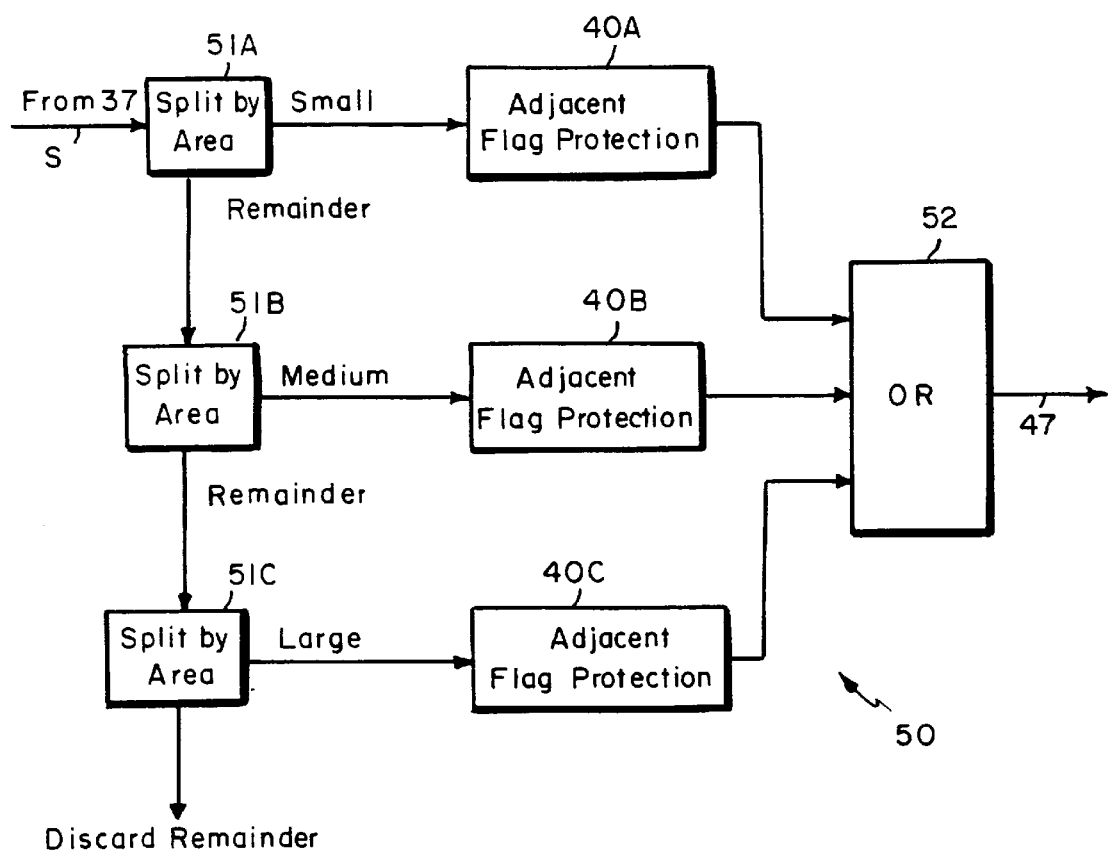
FIG. 5 shows a preferred form of adjacent flag protection circuit.

In a modification of the circuit shown in FIG. 4, the reliability of correctly identifying blemish flags rather than flags derived from motion artifacts is improved by looking for similarly-sized areas of flags in adjacent frames rather than simply the presence or absence of flags in adjacent frames, since moving objects tend not to change size significantly from frame to frame. A circuit for implementing this is illustrated in FIG. 5, which shows a circuit 50 which replaces the circuit 40 in FIG. 4. The circuit 50 is coupled to the output of threshold circuit 37 to receive the filtered 'significant changes' signal S. This signal is applied to three area-splitting circuits 51A, 51B, 51C coupled in cascade, which split the signal in dependence upon whether the flagged areas are small, medium or large. A respective adjacent-flag-protection circuit 40A, 40B, 40C is connected to the output of each of the circuits 51A, 51B, 51C. Each adjacent-flag-protection circuit is similar to the circuit 40 in FIG. 4, but in each one the degree of flag-spreading applied in the respective circuit 43 is different, being larger for the large flagged areas output by splitting circuit 51C and smaller for the small flagged is areas output by splitting circuit 51A.

Figure 6:
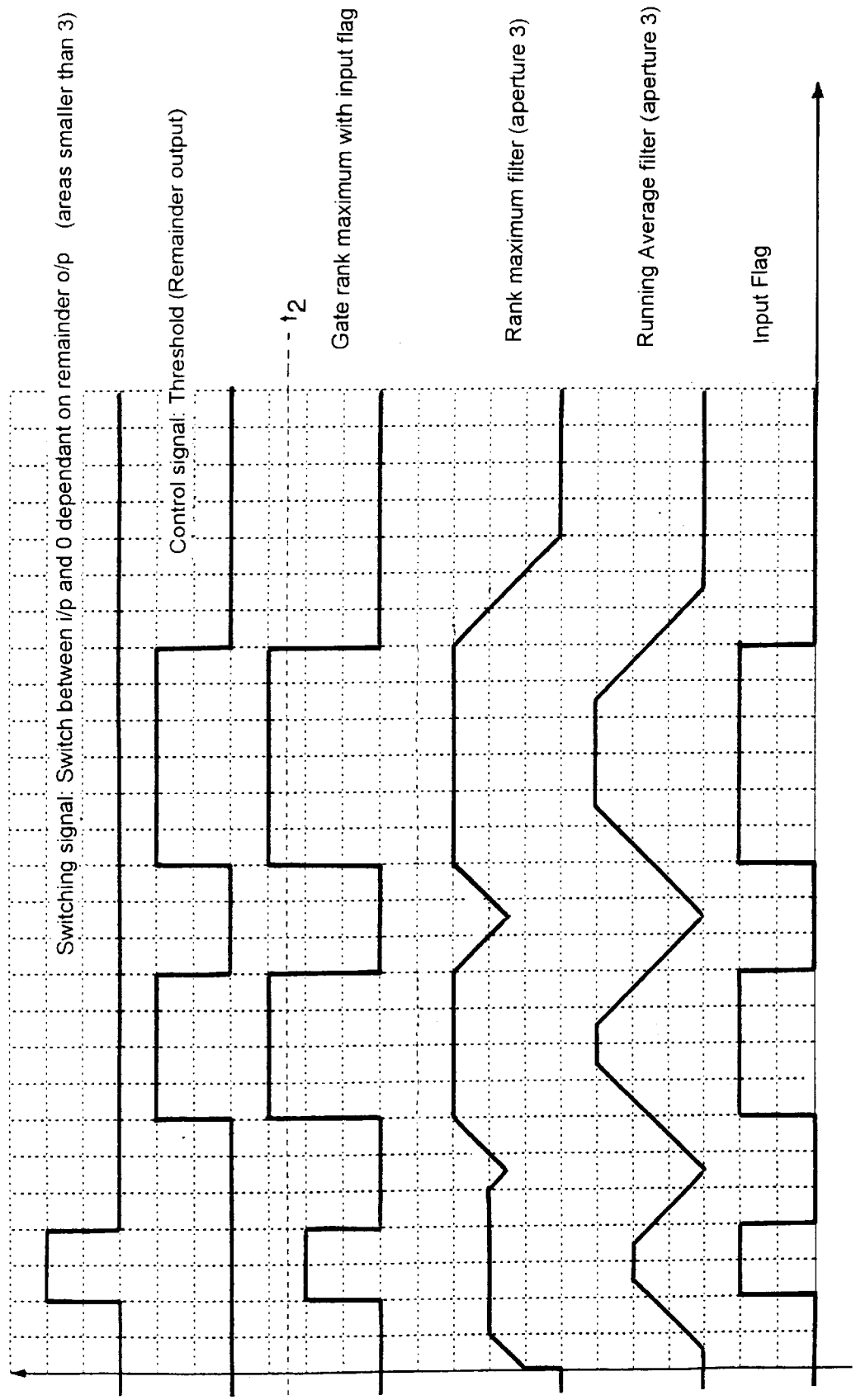
FIG. 6 is a waveform diagram illustrating the operation of the area splitting circuits 51 in FIG. 5.
Figure 7:
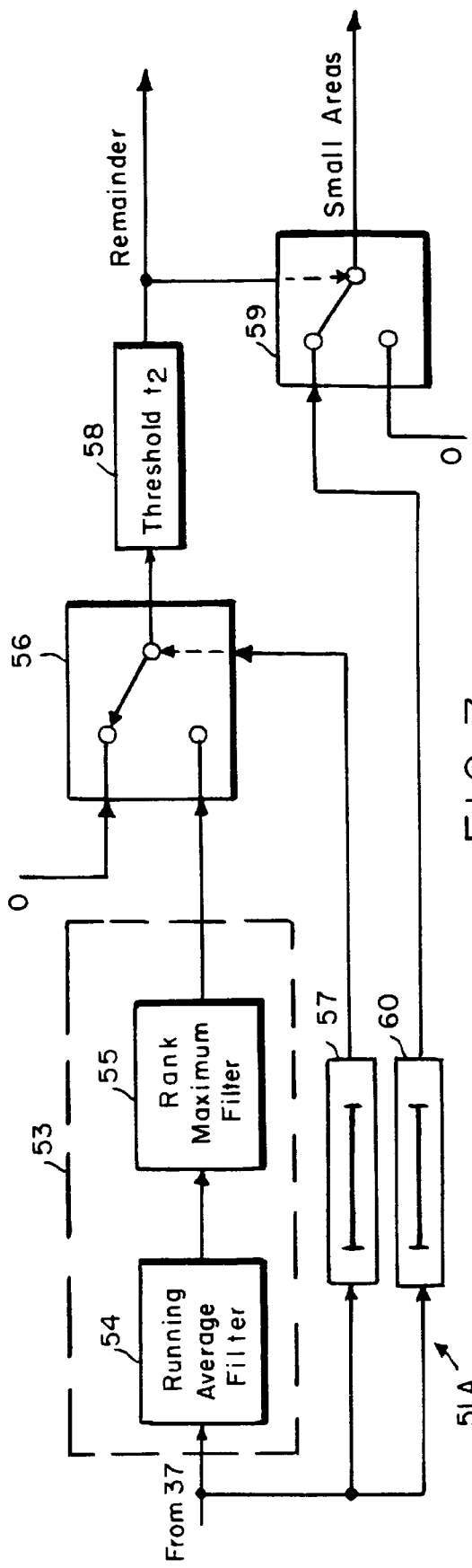
FIG. 7 is a block schematic diagram showing one form of the area splitting circuits 51 of FIG. 5.

The area-splitting circuits 51 operate on the principles illustrated in FIG. 6 and can take the form shown in FIG. 7. At (a) in FIG. 6 three input flags (of sizes 2, 4 and 6 units respectively) are shown in one dimension. These are applied to a running average filter with an aperture equal in size to the smallest flag area that should not be output by the area-splitting circuit to its respective adjacent-flag-protection circuit. Flags of that area and larger should be output to the next area-splitting circuit in the cascade. The running average filter, in this case with an aperture size of 3 units, outputs the average value of the signal within the aperture and gives waveform (b) in FIG. 6. This waveform is then applied to a running rank maximum filter with the same aperture (3 units) which produces the waveform (c ) in FIG. 6. A running rank maximum filter outputs the maximum signal value falling within the filter aperture at any point. This waveform (c ) is then gated with the input flag signal (a) from the threshold circuit 37, to provide the waveform (d). This gives a signal the amplitude of which depends upon the size of each flagged area. As reflected in FIG. 6, flags of area equal to or larger than the aperture size produce equal, maximum, signal amplitudes and flags smaller than the aperture size produce lower signal amplitudes. The gated signal (d) is compared with a threshold $t_2$ which is set at a level just below the maximum amplitude to provide a remainder control signal, waveform (e), and a switching signal, waveform (f). Using the remainder signal and the switching signal to control the two outputs of the area-splitting circuits 51, the input signal can readily be split into two output signals, one containing areas smaller than the filter apertures and the other containing areas equal to or larger than the filter apertures. To do this (using area-splitting circuit 51A as an example), when the switching signal (f) is logic high, the input flag signal is switched to the output of the area-splitting circuit 51A coupled to the respective adjacent-flag-protection circuit 40A. When the switching signal (f) is logic low, a null, or zero, signal is output to the respective adjacent-flag-protection circuit 40A. To generate the remainder signal to be output to the next area-splitting circuit in the cascade (51B), the input flag signal is switched to the next area-splitting circuit while the remainder control signal (e) is logic high. When the remainder control signal is logic low, a null, or zero, signal is output to the next area-splitting circuit.

Figure 13:
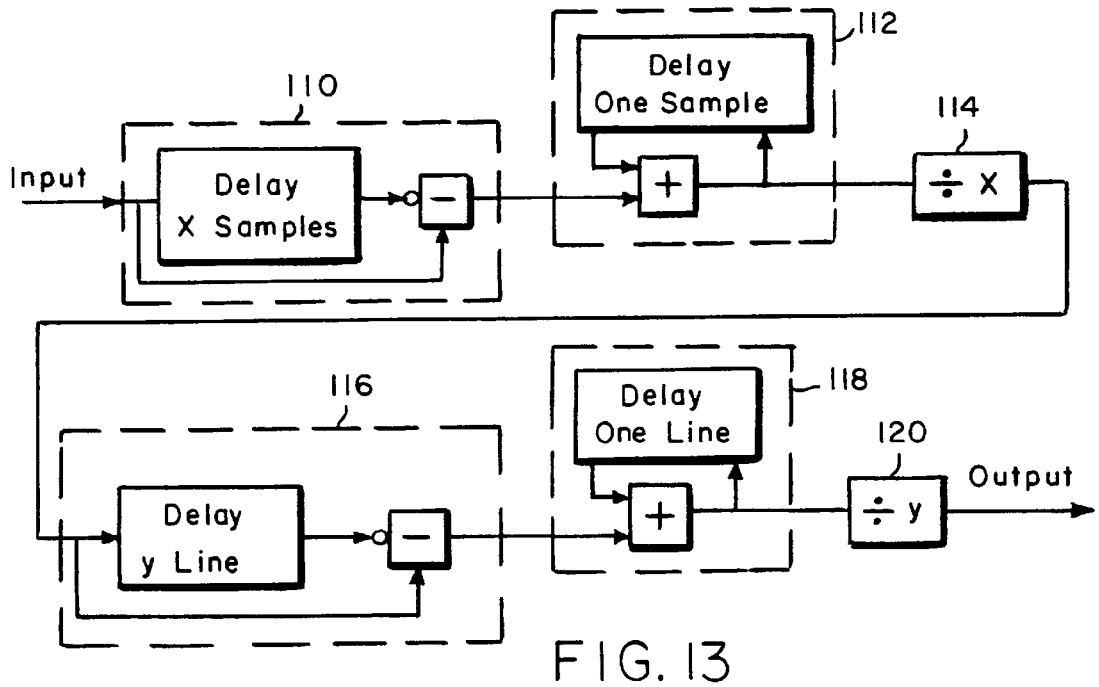
FIG. 13 is a block diagram of a two-dimensional running average filter.
Figure 14:
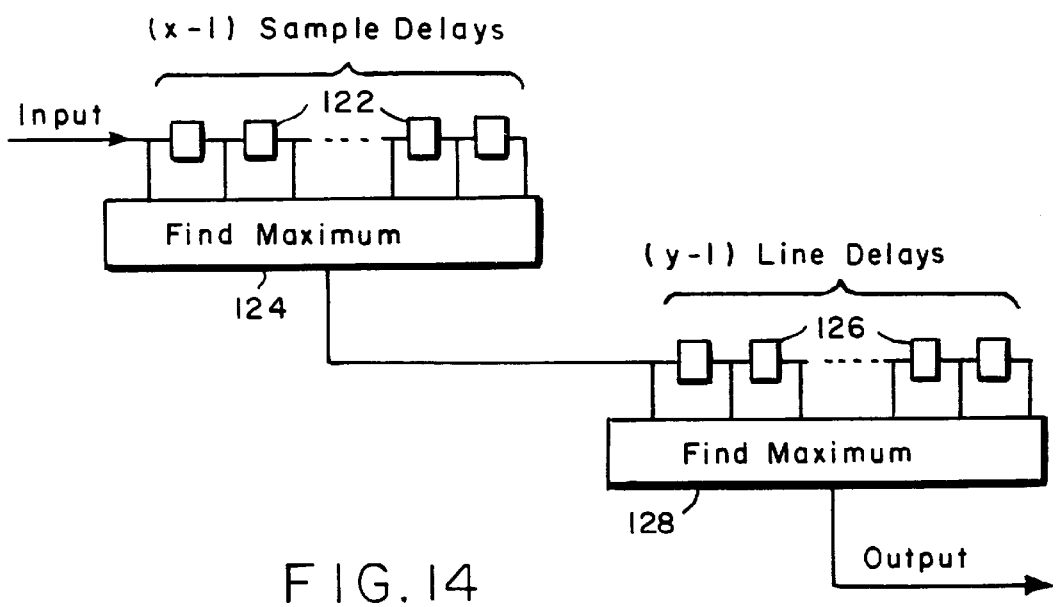
FIG. 14 is a block diagram of a two-dimensional running rank maximum filter.

The extension of the foregoing to two dimensions will be apparent to the reader. The running average filter and the running rank maximum filter are extended to two dimensions in conventional manner for example as shown in FIGS. 13 and 14. FIG. 13 shows a block diagram of a two-dimensional running average filter. The filter s comprises, connected in series, a differentiator 110, an integrator 112 and a normaliser 114 operating with an aperture size of x samples, or pixels, in the X direction (horizontal) and a differentiator 116, an integrator 118 and a normaliser 120 operating with an aperture size of y lines in the Y direction (vertical). Thus the X direction filter and the Y direction filter are connected in cascade. In each case the normaliser divides by the number of elements in the aperture. In each filter (X or Y) the differentiator, the integrator and the normaliser can in fact be connected in any order.

Figure 15:
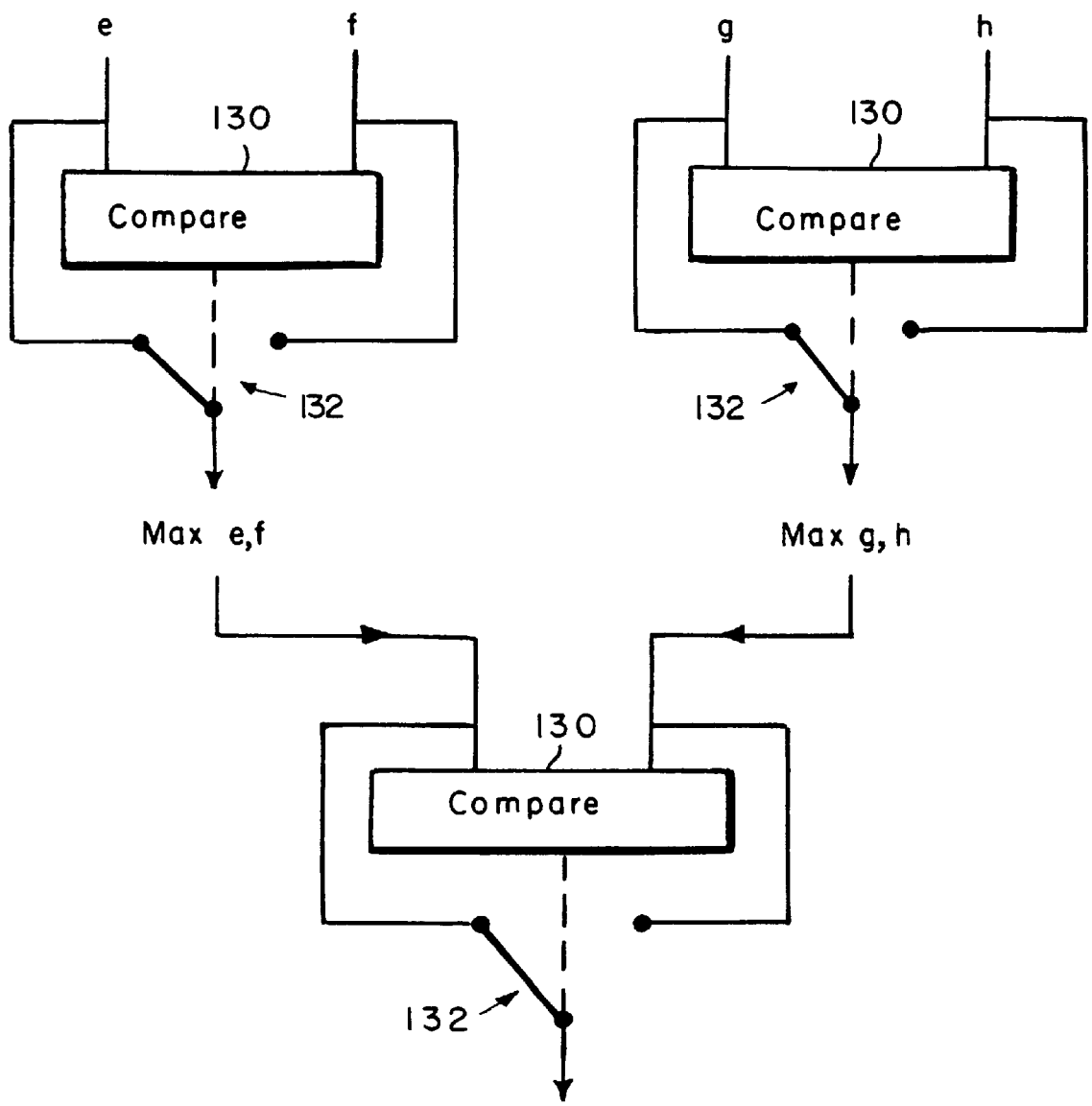
FIG. 15 is a block diagram of a portion of a final maximum circuit as used in the filter of FIG. 14.

FIG. 14 shows a block diagram of a two-dimensional running rank maximum filter. The filter comprises a cascade of (x−1) one-sample, or one-pixel, delays 122. Side branches from the cascade carry x sample values from x consecutive pixels to a circuit 124 which outputs the maximum sample value. The successive maximum sample values output by circuit 124 are input to a cascade of (y−1) one-line delays 126. Side branches from the cascade carry y sample values, each being the maximum sample value of a set of x samples selected by circuit 124, to a circuit 128 which outputs the maximum of the y sample values. This is the maximum sample value within the x by y aperture of the filter. Each "find maximum" circuit 124, 128 is formed of a cascade of comparators 130 and switches 132 connected in a tree structure. A portion of such a tree structure is shown in FIG. 15. Each tree comprises (w−1) comparator/switchers to find the maximum of w inputs (if w is a power of 2).

Suitable circuitry is illustrated in FIG. 7 which shows the circuit 51A. The output of the threshold circuit 37 is applied to a circuit 53, which forms part of circuit 51A for measuring the size of the flagged area. The circuit 53 includes a running average filter 54 which filters over an aperture of size x by y pixels. The output of the filter 54 is applied to a rank maximum filter 55 which operates likewise over a two-dimensional area x by y. The output of the filter 55 constitutes the output of the circuit 53 and is applied to a first input of selector switch 56. The second input of the selector switch 56 is connected to logic low. The output of the filter 55 is gated by using the input flag signal (after delay in an appropriate compensating delay 57) to control the selector switch. The output of the selector switch 56 is applied to a threshold circuit 58, which compares the gated signal output by the selector switch 56 with a threshold $t_2$. The output of the threshold circuit 58 constitutes the 'remainder' output of the circuit 51A. The output of threshold circuit 58 is also applied to control a selector switch 59, which receives at a first input the input flag signal through a compensating delay 60, and works inversely to the selector switch 56 to provide an output signal indicating those areas which are smaller than x by y. The second input of the selector switch is 56 is coupled to logic low.

This process is repeated in circuits 51B and 51C (which are cascaded with circuit 51A) using different, increasing aperture sizes, so as to split the flagged areas into groups dependent on the size of the flagged area. It should be noted that flagged areas which are close to each other can affect the measurement of each other's areas, because one filter aperture may cover, at least partially, more than one flagged area. The difference in aperture size from one group to the next should not be made too large, in order to help reduce this effect.

In practice it is difficult to make the rank maximum filter 55 for anything other than the smallest aperture. We have found that a good approximation to a given aperture area (say x by y) can be obtained by doubling the linear dimensions of the aperture, and performing separate 2x and 2y running average filter operations in orthogonal X and Y directions, (i.e. using aperture sizes of 2x by 1 pixels and 1 by 2y pixels in the respective filters). For each pixel of the image, the output of the flagged area size measurement circuit is then the greater, or maximum, of the outputs of the two one-dimensional running average filters with their respective apertures centred on that pixel. A circuit for implementing this is illustrated in FIG. 8.

Figure 8:
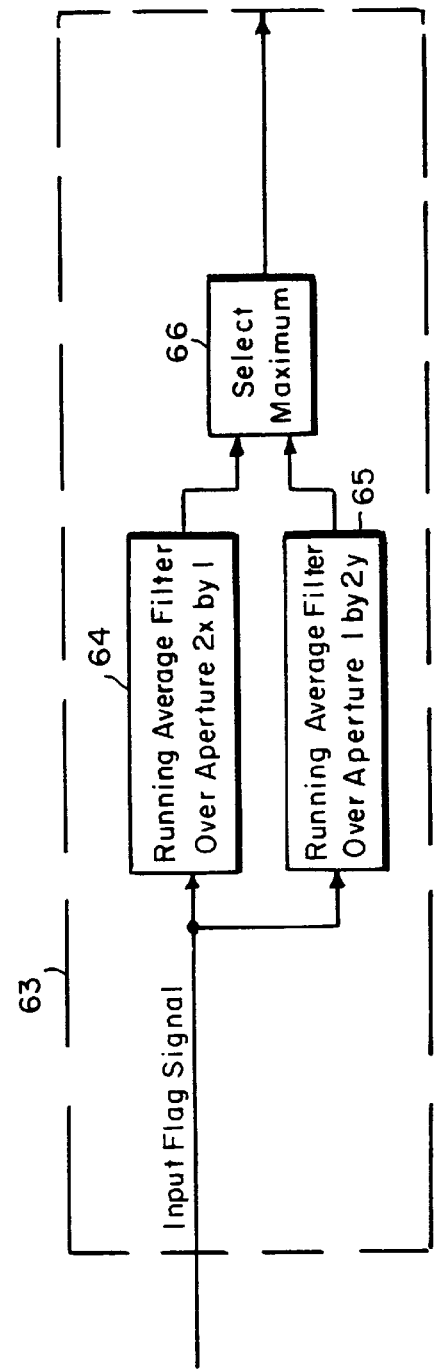
FIG. 8 shows an alternative for part of the circuit of FIG. 7.

The flagged area size measurement circuit 53 of FIG. 7 can be replaced by the circuit 63 of FIG. 8, which includes a running average filter 64 which operates in the X direction over an aperture size of 2x, and a running average filter 65 which operates in the Y direction over an aperture size 2y. A circuit 66 selects the maximum of the outputs of circuits 64 and 65 for each pixel.

The threshold in the threshold circuit 58 should then be adjusted empirically since this approximate method of obtaining the flag area size causes a drop in the size value towards the edges of each of the flagged areas (i.e. while the size measurement circuit 53 produces, in theory, a size value signal of substantially constant value across the whole area of a flag, as illustrated at (c) in FIG. 6, the size measurement circuit 63 produces a size value signal which tends to fall in value towards the edges of a flag).

At the level of each flag size area range, the area which is searched by the respective adjacent-flag-protection circuit for flags in adjacent frames is dependent upon the largest flag area to be retained at that level. An assumption has to be made as to how far objects are likely to move from frame to frame. For example, it may be assumed that objects are unlikely to move more than 5 times their own dimensions from one frame to the next. Then the search areas are set to 5 times the dimensions of the largest object for that level.

With this system dirt flags can be removed inappropriately. Dirt spots of similar size that are close to each other but in adjacent frames will be detected as moving objects in the image and thus the corresponding dirt flags will be removed and the dirt not concealed. By adding more levels of size range, it is possible to remove fewer dirt flags in this way, as the dirt spots must get closer and closer together in terms of size if they are to be removed inappropriately. However, this also leads to less of the motion being detected if there is any change in size of the moving object from frame to frame.

A problem with the system described is that very fast moving objects will not be protected. By 'very fast moving objects' is meant objects which move a long distance between frames with respect to their size. They will not be protected because they will move out of the area that is searched for adjacent flags. A system will now be described which addresses this problem by differentiating between motion and blemishes such as dirt in an entirely different way. This system is preferably used in combination with the method described with reference to FIGS. 2 to 8. However, in principle it could be used separately, and could be used to differentiate dirt and motion for other purposes. Thus it will first be described separately.

Film cameras generally have what is known as a shutter of approximately 180 degrees, that is to say the shutter is open for approximately half of each film frame period. This leads to a degree of integration. By virtue of this camera integration the edges of moving objects are not completely sharp, but are slightly fuzzy.

In fact, they are turned into ramps (extending mainly in the direction of motion of the object); the faster an object moves, the more camera integration there is, and the shallower is the ramp caused by its edges.

Dirt, on the other hand, is stationary on the film and will tend to have very much sharper edges than moving objects. The same is in general true for other types of blemish.

Figure 9:
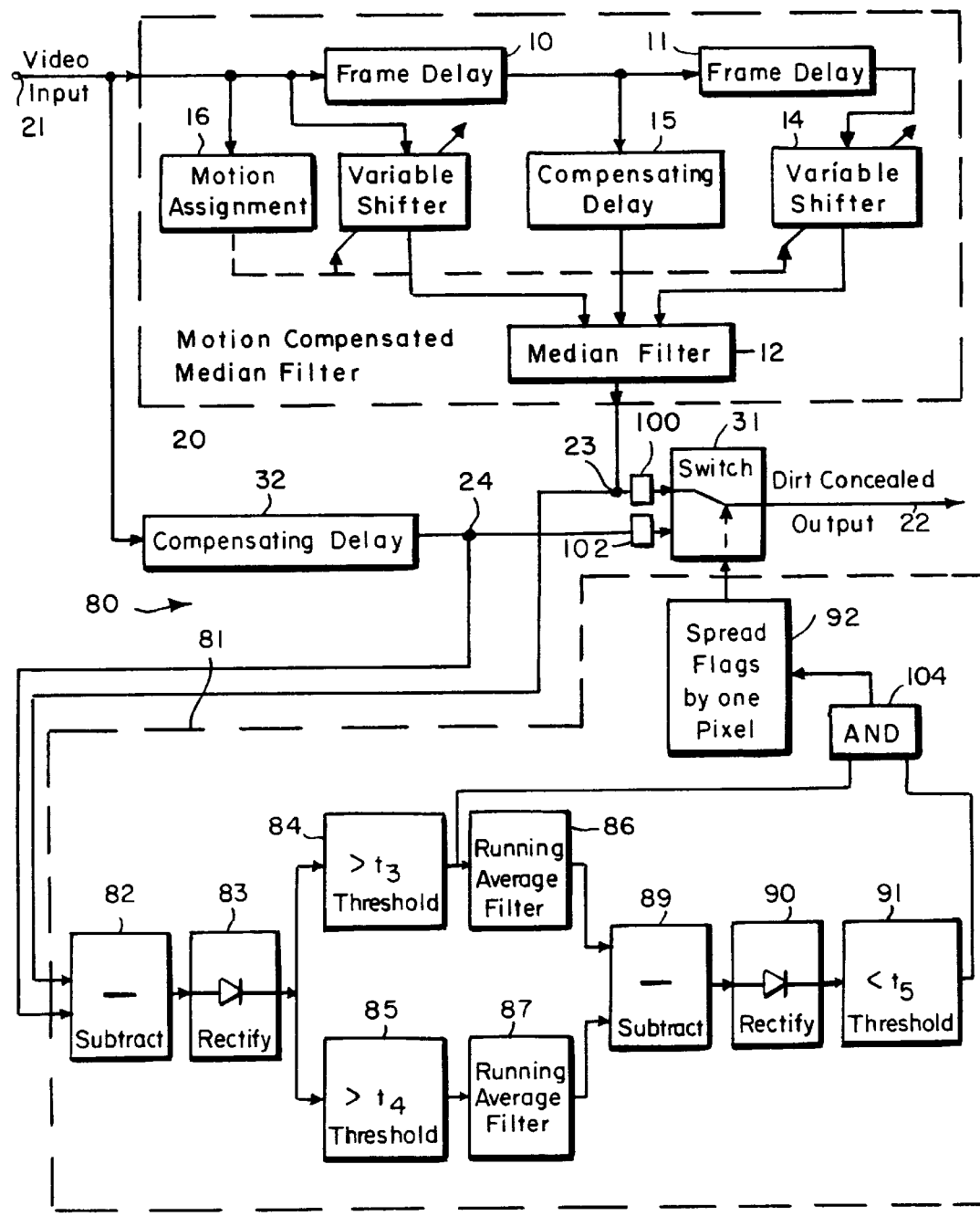
FIG. 9 is a block circuit diagram of an alternative to the circuit of FIG. 2 in which flags are distinguished by the slopes of their edges.

This difference can be used to distinguish motion from blemishes using the circuit 80 shown in FIG. 9. The top half of this figure is the same as FIG. 2 and is not therefore described again. The bottom part of the figure shows a detection circuit 81 which replaces the side-chain circuit 33 of FIG. 2. The detection circuit 81 receives the output 23 of the median filter circuit 20 and the delayed input signal 24. These are applied to a subtracter 82 and rectifier 83, similar to the subtracter 34 and rectifier 35 in FIG. 2. The output of the rectifier 83 is applied now in parallel to two threshold circuits 84 and 85, which work with different respective thresholds $t_3$ and $t_4$. The outputs of the threshold circuits 84 and 85 are applied respectively to two running average filters 86 and 87, the outputs of which are applied to the two respective inputs of a subtracter 89. The subtracter output is then rectified in a rectifier 90 and applied to a further threshold circuit 92 (working with a threshold $t_5$), the output of which is high when the input is below $t_5$. The output of threshold circuit 92 is combined in an AND gate 104 with the output of threshold circuit 84. The output of the AND gate 104 forms the flag signal, which is applied to a spreading circuit 93 corresponding to the circuit 38 of FIG. 2.

Figure 10:
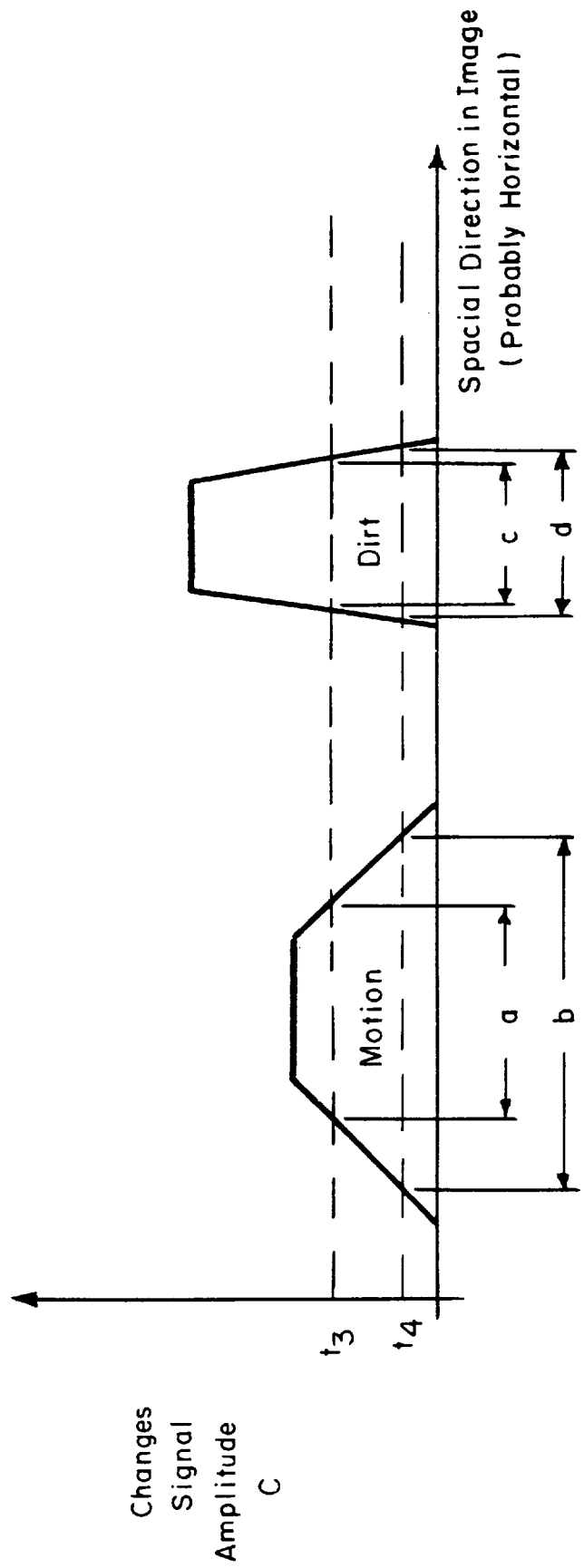
FIG. 10 illustrates the operation of the arrangement of FIG. 9.

The operation of the detector circuit 81 is illustrated in FIG. 10. As noted above, due to camera integration, motion, shown on the left in FIG. 10, has a less steep profile than dirt, shown on the right, which has a steeper profile in the 'changes' signal C. By looking at the change in the area covered when this signal is thresholded at two different levels, it is possible to distinguish between the dirt and motion. As seen in FIG. 10, the motion extends over region a at the first threshold $t_3$, and over a considerably wider region b when subjected to the second, lower threshold $t_4$. Subtracting signals comprising signals of length a and b respectively gives rise to a significant difference signal which exceeds the threshold $t_5$. Conversely, the dirt extends over region c at the first threshold $t_3$, and over region d at the second threshold $t_4$, the difference in extent of c and d being small. Subtracting signals comprising signals of lengths c and d respectively gives rise to a small difference signal which does not exceed threshold $t_5$. If a dirt spot having a very steep edge profile is present, then the regions a and b may be equal (within the resolution of the sampling of the image). The output of the subtracter 90 can then be zero, which is the same as if there is no difference at all between the original image signal and the median-filtered signal. Combination of the outputs of threshold circuits 84 and 92 in AND gate 104 means that the flag signal output from the AND gate can only be high if the difference between the original image and the median-filtered signal exceeds threshold $t_3$.

While described in one dimension, the implementation is again preferably achieved in two-dimensional form.

Finally the remaining flagged areas are spread by one pixel to ensure that the dirt spots are fully covered. The resultant is then used, in this instance, as a control signal to switch between the input video signal and the motion-compensated median-filtered signal. The median-filtered signal is used when the flag indicating the presence of dirt is set.

Figure 11:
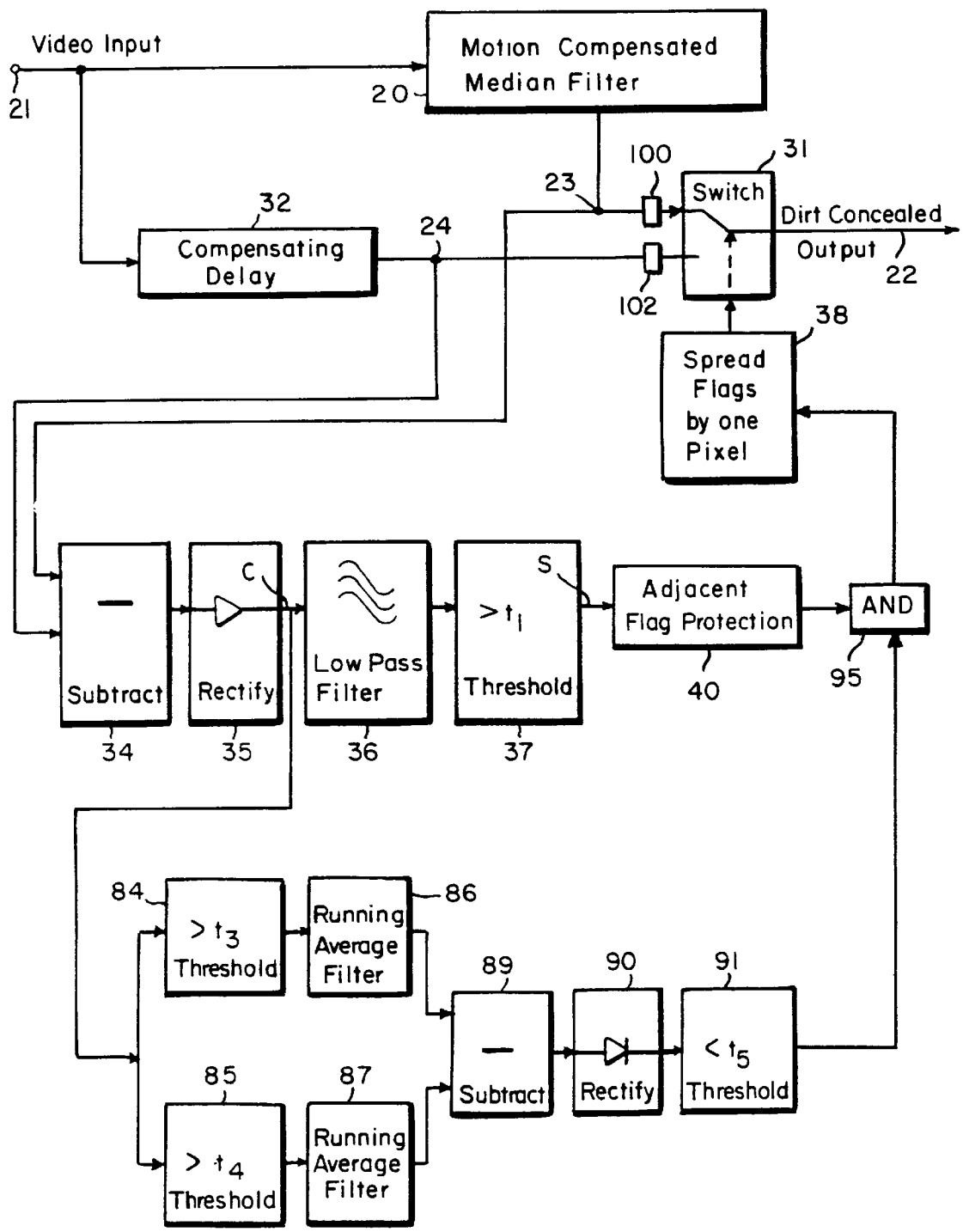
FIG. 11 is a block circuit diagram of an improved film dirt concealer using the features of all the preceding figures together in combination.

The various features described are preferably used in combination, as is illustrated in FIG. 11. This uses the reference numerals previously used, and is not described in detail. Adjacent-flag protection 40 is incorporated in the side-chain, as is camera-integration motion protection. The outputs of the adjacent flag protection circuit 40 and the threshold circuit 92 are combined by an AND gate 95 before application to the one-pixel spreading circuit 38, and thus the median-filtered signal is only selected for output when both the adjacent-flag-protection circuit and the threshold circuit for sensing the steepness of flag edges indicate that a flag is derived from a blemish and not from, for example, a motion artifact. The subtracter 34, rectifier 35 and flag spreading circuit 38 are common and thus do not need to be duplicated. The AND gate 95 also achieves the same function as AND gate 104 in FIG. 9, which is therefore not required.

The embodiments have been described in hardware form, but could alternatively be implemented in software. In this case the hardware diagrams may be regarded as equivalent to software flow charts.

In the descriptions of the invention and embodiments herein, processing is advantageously based on the luminance signal of the video signals being processed, but may be based on other parameters such as chrominance.

As described, various methods are proposed to improve the quality of film pictures in a video signal by removal of film dirt. The methods are also useful in relation to other blemishes in video signals. Although the level of dirt concealment itself may be no better, or even reduced, compared with previously-proposed systems, we have found that there can be a particularly advantageous subjective improvement in the dirt-concealed image due to the elimination of artifacts introduced in the original, simple, dirt-concealment process. For example, the substantial elimination of the noise reduction inherent in the prior art dirt-concealment systems can significantly enhance perceived image quality.

What is claimed is:

1. A method for concealing blemishes in a video signal, in which a preliminary blemish-concealed video signal is generated from an input video signal, a flag signal is generated indicative of differences between the preliminary signal and the input signal, the flag signal is modified in order to remove flags associated with movements in the image rather than with blemishes by comparing flags in a flag signal derived from a current frame with flags in a flag signal derived from an adjacent frame and, if a flag exists in the adjacent-frame flag signal within a predetermined distance of the flag in the current-frame flag signal, disabling the flag on the current frame, and an output blemish-concealed signal is formed by selecting between or combining the preliminary signal and the input signal in dependence on the flag signal.

2. A method according to claim 1, in which each pixel of the output signal is selected from the preliminary signal if the flag signal indicates the presence of a blemish at that pixel and from the input signal if the flag signal does not indicate the presence of a blemish at that pixel.

3. A method according to claim 1, in which the flag signal is generated by taking the difference between the preliminary signal and the input signal and comparing the resulting difference signal with a threshold value to produce a two-state flag signal.

4. A method according to claim 3, in which the difference signal is low-pass filtered.

5. A method according to claim 3, in which flagged areas in the flag signal are spread, or increased in area.

6. A method according to claim 1, in which preliminary blemish-concealment is performed using a median filter.

7. A method according to claim 1, in which the predetermined distance is varied in dependence on the size of a flag.

8. A method according to claim 7, in which the flags in a current-frame flag signal are divided into a plurality of groups according to their size and each resulting group of flag signals is processed to find whether a flag exists in an adjacent-frame flag signal within a predetermined distance of each flag in the current-frame flag signal, a constant predetermined distance being used for all flags in each group of flags depending on the range of flag sizes in the group.

9. A method according to claim 7, in which the flag sizes are evaluated by passing the flag signal through a two-dimensional running average filter and then a two-dimensional rank maximum filter having the same aperture as the running average filter to produce a size signal.

10. A method according to claim 7, in which the flag sizes are evaluated by passing each flag through two one-dimensional running average filters operating in non-parallel directions and selecting as the size value the maximum, or greater of the outputs of the two filters.

11. A method according to claim 9, in which the size signal is gated with the input flag signal and the gated signal is compared with a threshold value to form a switching signal, which controls the switching of the input flag signal to form output group signals containing groups of flags of areas greater than or less than the aperture size respectively.

12. A method according to claim 9, in which the flag sizes are evaluated in a cascade of stages, each stage outputting a signal including flags of a different predetermined range of sizes.

13. A method according to claim 1, in which the largest flags are discarded.

14. A method according to claim 1, in which flags in a current-frame flag signal are compared with an adjacent-frame flag signal by, for the purposes of the comparison, enlarging each flag in the current-frame flag signal to a predetermined area corresponding to the predetermined distance and examining whether the enlarged flag overlaps a flag in the adjacent-frame flag signal.

15. A method according to claim 1, in which the preliminary signal and the input signal are combined by addition in predetermined ratio to form the output signal, the ratio being fixed or variable.

16. A method for distinguishing blemishes in a video signal, in which a difference signal is generated representative of blemishes and other differences between images, and the blemishes and other differences are distinguished by reference to the steepness of the slope of the difference signal at the edges of each blemish or other difference.

17. A method according to claim 16, in which the difference signal is rectified and compared with two different threshold values, distances in the image between points at which the difference signal crosses the two threshold values indicating the steepness of the slope of the difference signal.

18. A method according to claim 17, in which a first distance is evaluated between points at which the difference signal crosses and recrosses the first threshold on opposite sides of a blemish or other difference value, a second distance is evaluated between points at which the difference signal crosses and recrosses the second threshold value, the first and second distances are subtracted one from the other and the subtracted signal is rectified and compared with a threshold value, the blemish or other difference being identified as either a blemish or another difference depending on the comparison with the threshold value.

19. An apparatus for concealing blemishes in a video signal comprising a blemish concealer, a side chain for generating a flag signal indicative of differences between the video signal input to the blemish concealer and the corresponding preliminary blemish-concealed signal output by the blemish concealer, an adjacent-flag protection means having a flag signal comparison means for comparing flags in a flag signal derived from a current frame with a flag signal derived from an adjacent frame and for disabling a flag in the current-frame flag signal if a flag exists in the adjacent-frame flag signal within a predetermined distance of the flag in the current-frame flag signal, and a selector switch or combining means having two inputs, for receiving the video signal and preliminary blemish-concealed signal respespectively, and output for outputting a blemish-concealed signal, and being controlled by the flag signal.

20. An apparatus according to claim 19, in which the side chain (33) comprises, connected in series, a subtracter (34) for taking the difference between the preliminary blemish-concealed signal and the input signal, a rectifier (35), a low-pass filter (36), and a threshold comparator (37), the output of the comparator forming the flag signal.

21. An apparatus according to claim 19, in which the flag signal is spread by a flag spreader (38).

22. An apparatus according to claim 19, in which the current-frame flag signal is input to a plurality of flag area sensing means (51A, 51B, 51C) connected in a cascade so as to separate each flag in the flag signal according to its size into one of a plurality of size bands, each flag area sensing means outputting flags in a respective size band to an input of a corresponding one of a plurality of adjacent-flag-protection means (40A, 40B, 40C), each of which compares flags with those in an adjacent frame using a predetermined distance selected according to the flag sizes in the corresponding flag size band and the outputs of the adjacent-flag-protection means being combined in an OR gate to form the output flag signal.

23. An apparatus according to any of claims 20, 21, and 22, in which the combining means (31) adds the input video signal and the preliminary blemish-concealed signal after multiplication by complementary factors, the factors being fixed or variable.

24. An apparatus for distinguishing blemishes in a video signal, comprising a means for generating a difference signal representative of blemishes and other differences between images, coupled to a means for distinguishing blemishes from other differences in the difference signal by reference to the steepness of the slope of the difference signal at an edge of each blemish or other difference.

25. An apparatus according to claim 24, in which the difference signal is passed through a rectifier (35) before being input to the blemish-distinguishing means, which comprises two threshold comparators (84, 85) connected in parallel, operating with different thresholds, each coupled at its output to a running average filter (86, 87) the filter outputs representing the distance in the image between the points at which the rectified difference signal crosses and recrosses each threshold, the filter outputs are subtracted in a subtracter (89) and the subtracter output rectified in a rectifier (90) and compared to a further threshold in a threshold comparator (91), the output of which indicates the nature of the blemish or other difference and is combined with the flag signal in an AND gate (95) to form a blemish-distinguished flag signal.

* * * * *